April 4, 1967
W. H. AVERY
3,312,108
TEMPERATURE MEASURING DEVICE
Filed June 9, 1964
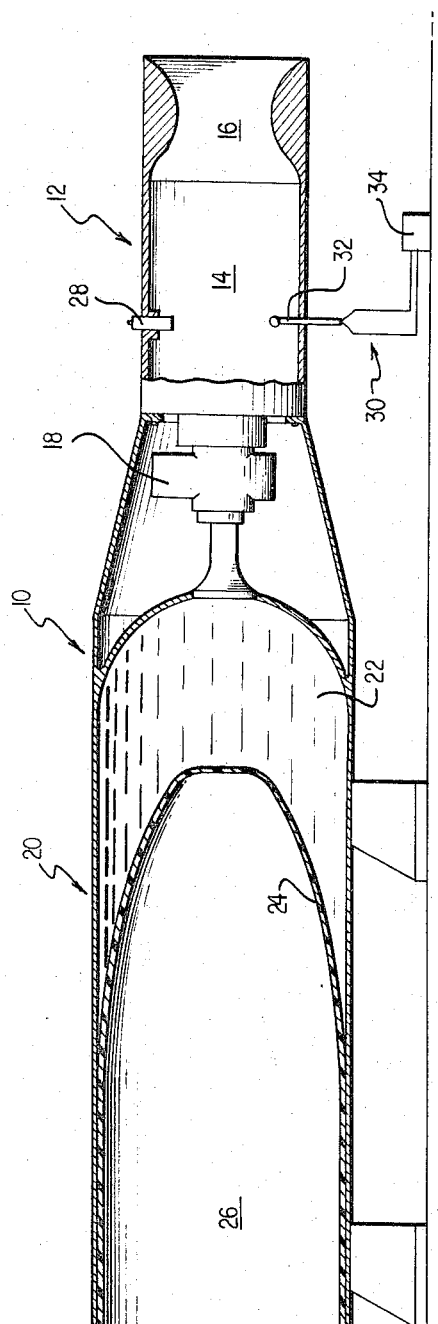
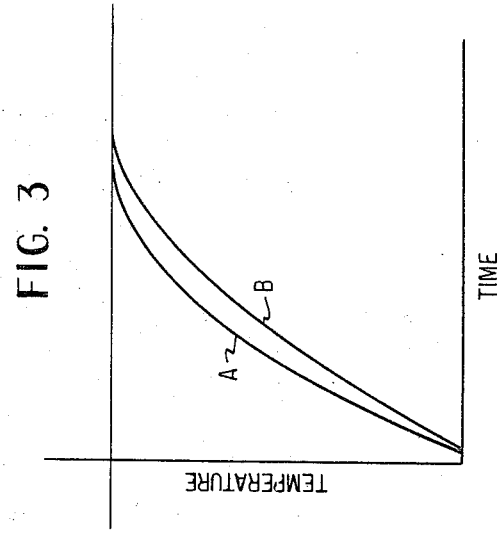
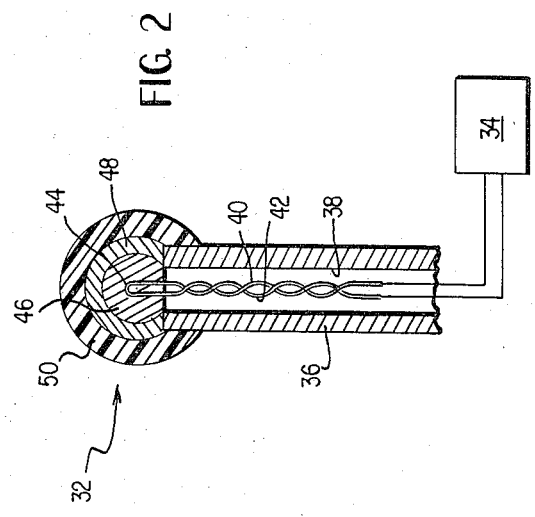
INVENTOR.
WILLIAM H. AVERY
BY *Stowell & Stowell*
ATTORNEYS.

3,312,108
TEMPERATURE MEASURING DEVICE
William H. Avery, c/o Applied Physics Laboratory, The Johns Hopkins University, 8621 Georgia Ave., Silver Spring, Md. 20910
Filed June 9, 1964, Ser. No. 373,708
4 Claims. (Cl. 73—359)

This invention relates to an improved temperature measuring device and, in particular, to a temperature measuring device suitable for determining the temperature of gases in environments wherein the gas temperature may approach or exceed the melting points of the materials of construction of the temperature sensitive element of the measuring device.

With the advent of reaction propulsion engines adapted to operate at high Mach numbers, it has become increasingly important to employ equipment which will provide accurate temperature readings of high Mach number airstreams and of the propellant gases in the combustion chambers of the reaction engines where very high operating temperatures may be encountered.

It is, therefore, a primary object of the present invention to provide new and useful temperature measuring means whereby the temperature of combustion gases in reaction engines may be readily obtained even though the temperature of the combustion gas may exceed the melting temperature of the temperature measuring device.

These and other objects and advantages are provided by the improved high temperature measuring device comprising means providing a temperature sensitive element, a heat sink formed about the temperature sensitive element, a heat insulator about the heat sink and heat responsive means cooperating with the heat insulator for rapidly removing the insulator to expose the heat sink to the temperature to be measured.

The invention will be more particularly described with reference to the accompanying drawings wherein:

FIG. 1 is a diagrammatic sectional view of a stationary reaction propulsion engine having mounted in the combustion chamber a temperature measuring device of the invention;

FIG. 2 is an enlarged fragmentary sectional view of the temperature measuring device illustrated in FIG. 1; and FIG. 3 diagrammatically illustrates two time-temperature curves for two different combustion gases.

Throughout the specification and claims, the terminology "temperature sensitive element," includes such temperature measuring devices as thermistor, thermocouple, resistance thermometers and the like. Further, the term "thermistor" includes the group of resistive circuit elements having a high negative temperature coefficient of resistance and may comprise the conventional bead, disc, washer or rod type thermistors generally known in the art. The term "thermocouple" includes devices that employ the voltage developed by the junction of two dissimilar metals to measure temperature differences.

The term "rapidly combustible" is intended to include materials such as nitrocellulose, pentolite, lead azide and their various solid mono-propellants which when heated to their ignition temperature burn rapidly or explode.

The term "heat insulator" is intended to include ablative materials such as nylon, teflon, polyethylene, graphite, etc.

Referring to the drawings and, in particular, FIG. 1 thereof, 10 generally designates a stationary reaction propulsion engine which includes a combustion section 12 including a combustion chamber 14 and a reaction outlet nozzle 16. The opposite end of the combustion chamber 14 is connected via fuel control valve 18 to a source of fuel and/or oxidant maintained in storage section 20 of the reaction engine.

In the illustrated form of the invention, the fuel 22 comprises a mono-propellant and is maintained under pressure by a flexible bladder 24 and a suitable pressurizing gaseous medium 26 as is well known in the art whereby upon opening of the fuel flow control valve 18 and energization of the electric squib or igniter 28, the mono-propellant is rapidly combusted in the combustion chamber 14 and the products of combustion thereof issue from the outlet nozzle 16.

Depending upon the type of fuel and its rate of transfer into the combustion chamber, the temperature of the propellant gases vary substantially. In FIG. 1 of the drawings, apparatus generally designated 30 is employed for measuring the temperature of the propellant gases. The temperature measuring device 30 includes a temperature responsive portion 32 and a temperature recording means 34. The temperature recording element 34 is of conventional form and forms per se no part of the present invention.

Referring to FIG. 2 of the drawings, the temperature sensitive portion of the device includes a support member 36 having a bore 38 therethrough. The support member 36 may be constructed of high temperature metals, porcelain, fused silica, and the like and the support may be further protected by a secondary tube of metal, silicon carbide, fire clay or the like.

Through the center of the support element 36 are the dissimilar electrical conductors 40 and 42 which may comprise, for example, a negative element 40 consisting of platinum and a positive element 42 consisting of 10% rhodium and 90% platinum. The dissimilar electrodes 40 and 42 form a junction at their extended end as illustrated at 44. The junction 44 is embedded in a heat sink 46 which may comprise such materials as copper, nickel or the like. The heat sink 46, a large mass relative to the mass of the temperature sensitive element, is provided with a heat insulating coating and means for rapidly removing the heat insulator at some predetermined time so that the entire outer surface of the heat sink is exposed to the high temperature gas stream.

The above desired results may be satisfactorily accomplished by providing the external surface of the heat sink 46 with a coating of rapidly combustible material 48. Suitable rapidly combustible materials may be nitrocellulose, pentolite, lead azide and the like. The rapidly combustible or explosive layer 48 is next coated with an ablative or heat insulating material 50.

In the specific form of the invention, the thickness of the ablative material should be selected for a particular application so that after a predetermined time $t$, for example, several seconds, the material would be ablated away exposing at least a portion of the underlying rapidly combustible layer 48. Once the rapidly combustible or explosive layer 48 is exposed to the high temperature gas stream, the layer 48 would rapidly combust, thereby completely removing the ablative layer to leave a clean surface of known geometry exposed to the gas stream whose temperature is to be measured.

As soon as the ablative layer is completely removed by explosion of rapid combustion of the layer 48, the hot gases would begin to heat up the inner bead of the thermal sink material 46 and the heating would continue until the bead reaches the temperature in equilibrium with the gas stream or if the temperature of the gas stream is sufficiently high the melting point of the bead. Depending upon the dimensions, the temperature and the flow conditions, the total time involved in the heating process could be varied from a fraction of a second to many seconds.

Determination of the gas temperature is made by constantly recording the temperature of the heat sink via the temperature sensitive junction 44 as it varies with time. From this information, the gas temperature can be inferred by standard methods of analysis. In brief, the analysis depends on recognition of the fact that the rate of temperature rise depends on three factors, that is, (a) heat transfer coefficient which varies with different gases, the gas pressure and velocity and bead geometry, (b) the thermal capacity of the bead which is equal to the product of the weight of the bead by the specific heat of the heat sink material and (c) the rate of temperature rise $dT/dt$. The two unknowns can be determined from measurements of the slope of the time-temperature curve. Referring, for example, to FIG. 3, A and B represent typical time-temperature curves for different gases. Where it is desired to measure the temperature of gases, which may be at temperatures greater than the melting point of the materials of construction of the thermocouple, it becomes necessary to accurately determine the zero point in the time measurement cycle and to record the temperature from the zero time to the final temperature or to, for example, the melting point of the heat sensitive element. With this portion of the time-temperature rise, the final temperature of the combustion gases can be readily calculated.

The outer layer of ablative material may comprise nylon, Teflon, polyethylene, graphite, etc. This listing of materials is given by way of example only and is not to be considered as limiting the possible ablative or heat insulating materials which could be employed with the device of the present invention.

As indicated hereinbefore, the thickness and the type of the ablative material would be selected for a particular application so that after a desired time, the material would be ablated to expose the rapidly combustible material whereby if temperatures of the combustion gases in, for example, the combustion chamber 14 are desired over a period of time a plurality of the units 30 could be installed within the combustion chamber with each device being provided with an ablative material layer differing in composition or in thickness whereby, for example, the temperature of the gas stream 1, 3, 5 and 7 seconds after ignition could be obtained.

EXAMPLE

Where it is desired to measure the exhaust gases in an outlet nozzle of a reaction engine having a recovery temperature of 6000° F. and a recovery pressure of about 1000 p.s.i. 10 seconds after ignition, a platinum and platinum-rhodium thermocouple is embedded in a heat sink of copper having a bead diameter of about ⅛ inch. The outer surface of the ⅛ inch copper heat sink is provided with a rapidly burning coating consisting of lead azide dispersed in cellulose acetate. A lead azide-cellulose acetate coating 20 mils in thickness would provide satisfactory results. The lead azide-cellulose acetate coating is then provided with a nylon coating 10 mils in thickness as nylon would ablate at a rate of about 1 mil per second under the conditions hereinabove stated. Thus, the heat sink would be completely exposed to the high temperature, high pressure gases in about 10 seconds.

From the foregoing description of preferred embodiments of the present invention, it will be recognized by those skilled in the art that the improved high temperature measuring device fully accomplishes the aims and objects hereinabove set forth. It will also be appreciated that various variations and modifications may be made in the structures without departing from the scope of the present invention.

I claim:

1. A high temperature measuring device comprising, means providing a temperature sensitive element, a heat sink having a large mass relative to the mass of the temperature sensitive element formed about the temperature sensitive element, a solid body heat insulator about the heat sink, and heat responsive means cooperating with the heat insulator for rapidly removing the insulator to expose the heat sink to the temperature to be measured.

2. A high temperature measuring device comprising, means providing a temperature sensitive element, a heat sink formed about the element, a rapidly combustible coating for the heat sink, and a coating of heat insulating material for the rapidly combustible coating.

3. A high temperature measuring device comprising, means providing a temperature sensitive element, a bead of high temperature melting metal formed about the element, rapidly combustible coating formed about the portion of the metallic bead to be exposed to the high temperature, and a coating of an ablative material applied about the rapidly combustible coating.

4. A high temperature measuring device comprising, a junction of dissimilar metals, a metallic bead formed about said junction and adapted to be exposed to a high temperature source, a rapidly combustible coating about the portion of the metallic bead to be exposed to the high temperature source, and a coating of an ablative material completely enclosing the rapidly combustible coating.

References Cited by the Examiner

UNITED STATES PATENTS

| | | | |
|---|---|---|---|
| 2,540,822 | 2/1951 | Hastings | 73—359 |
| 2,813,425 | 11/1957 | Wooley | 73—359 |
| 2,830,437 | 4/1958 | Woodward | 73—359 |
| 3,022,668 | 2/1962 | Lawson et al. | 73—362 |
| 3,038,951 | 6/1962 | Mead | 136—4.7 |
| 3,049,012 | 8/1962 | Daniels | 73—359 |

LOUIS R. PRINCE, *Primary Examiner.*

D. McGIEHAN, N. B. SIEGEL, *Assistant Examiners.*